Nov. 5, 1940.  N. A. DREIKOSEN  2,220,398
AGRICULTURAL DEVICE
Filed March 18, 1940  4 Sheets-Sheet 1

Norbert A. Dreikosen
INVENTOR

BY Victor J. Evans & Co.
ATTORNEYS

J. L. Wright
WITNESS

Nov. 5, 1940.   N. A. DREIKOSEN   2,220,398
AGRICULTURAL DEVICE
Filed March 18, 1940   4 Sheets-Sheet 2
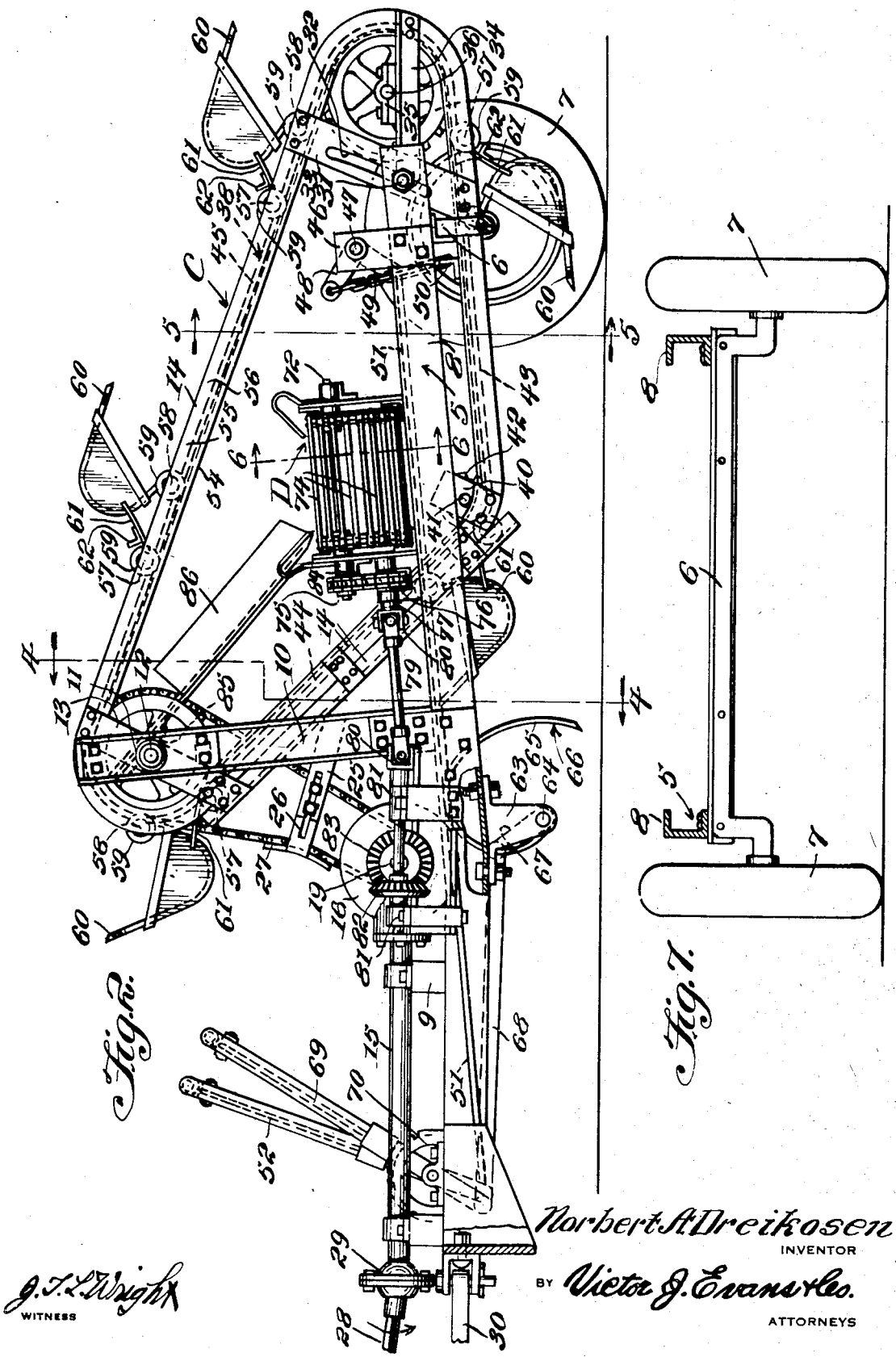

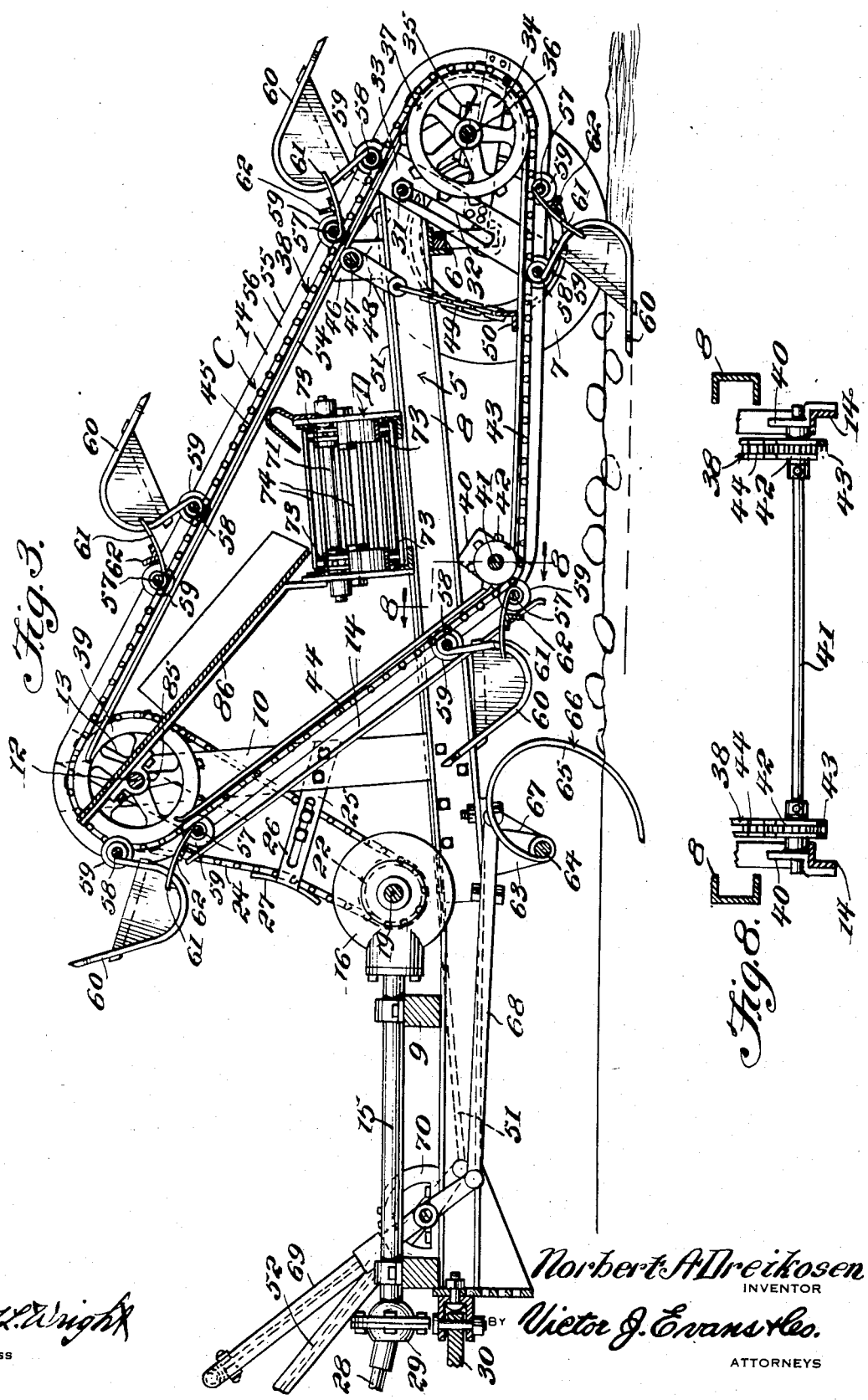

Nov. 5, 1940.   N. A. DREIKOSEN   2,220,398
AGRICULTURAL DEVICE
Filed March 18, 1940   4 Sheets-Sheet 4
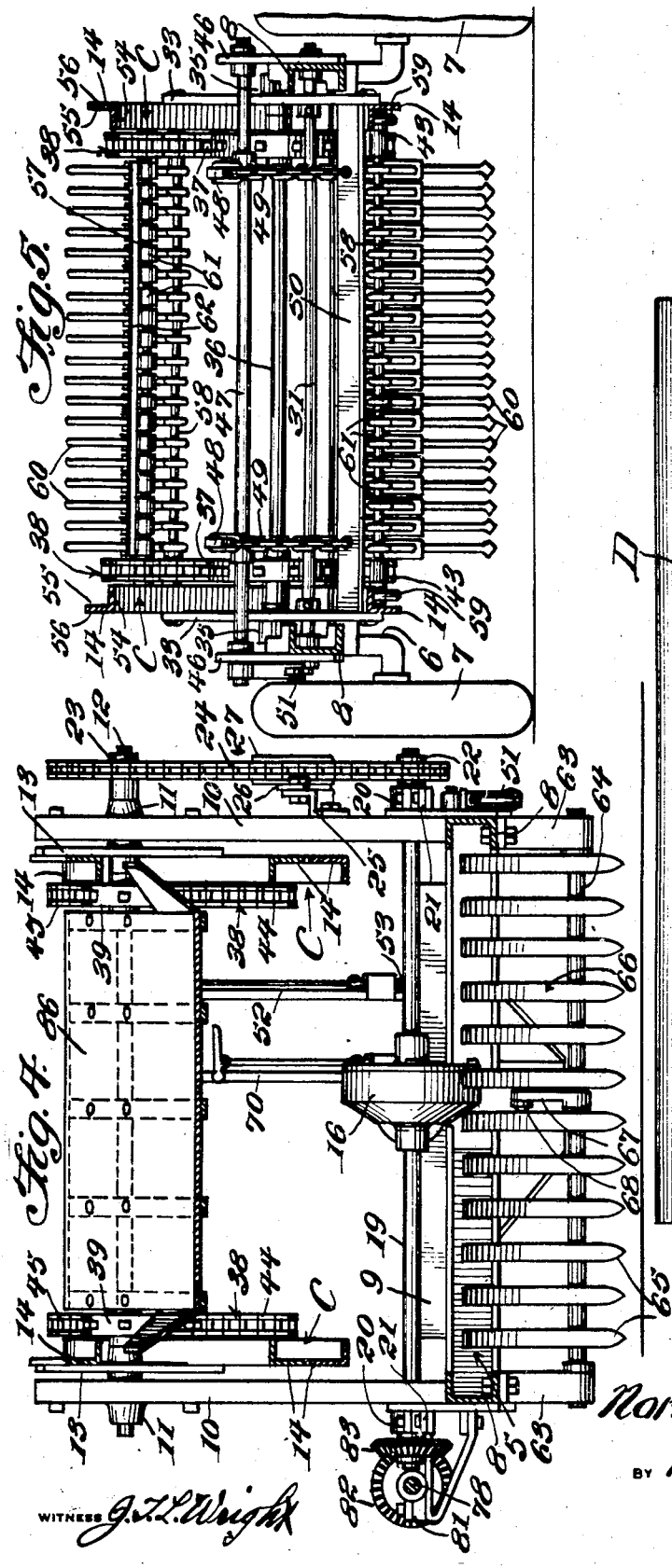
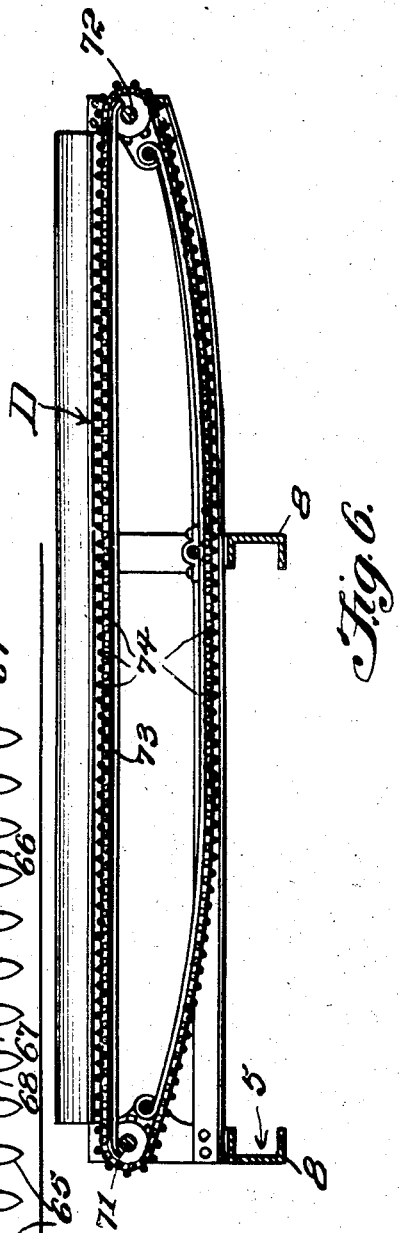
Norbert A. Dreikosen
INVENTOR
BY Victor J. Evans & Co.
ATTORNEYS
WITNESS G. T. L. Wright Patented Nov. 5, 1940

2,220,398

UNITED STATES PATENT OFFICE 2,220,398

AGRICULTURAL DEVICE

Norbert A. Dreikosen, Marathon, Wis.

Application March 18, 1940, Serial No. 324,697

2 Claims. (Cl. 55—51)

My invention relates to agricultural devices and has as one of the principal objects thereof the provision of an agricultural device equipped with means for automatically gathering vegetables, stones and the like from the ground.

Another object of my invention is to provide a device of the above described character which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 2 is a side elevation thereof partly in section.

Figure 3 is a longitudinal sectional view illustrating the parts in position for removing or gathering vegetables, stones and the like from the ground.

Figure 4 is a sectional view taken on the line 4—4 of Figure 2.

Figure 5 is a sectional view taken on the line 5—5 of Figure 2.

Figure 6 is a sectional view taken on the line 6—6 of Figure 2.

Figure 7 is a transverse sectional view of the rear section of the frame and illustrating the axle connected thereto.

Figure 8 is a detail sectional view taken on the line 8—8 of Figure 3

Figure 1:
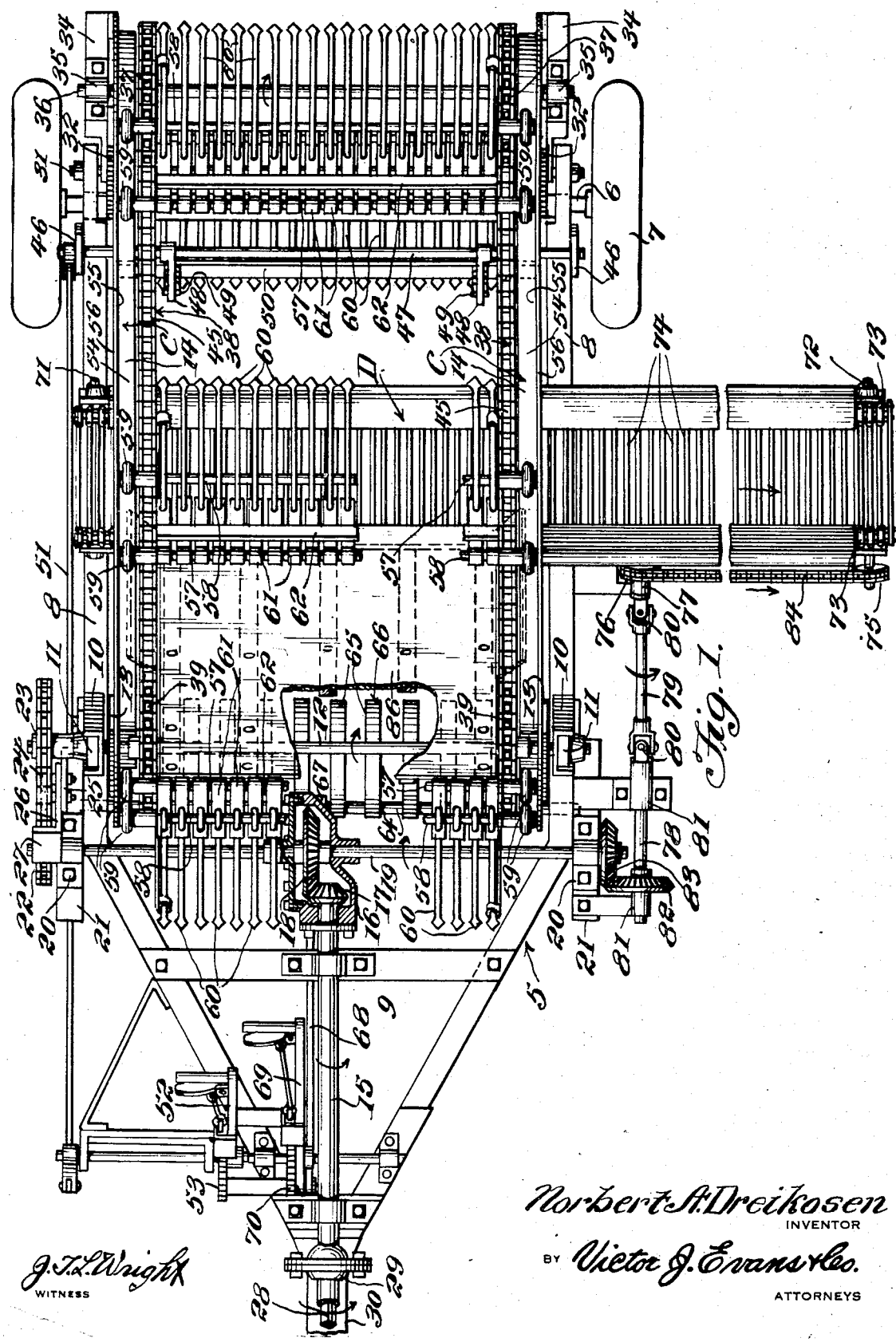
Figure 1 is a top plan view of my invention.

In practicing my invention I employ a frame 5 having front and rear end sections and with the under side of the rear end section having fixed thereto a transverse axle 6 of a substantially inverted U-shaped configuration and with the side portions thereof terminating in outwardly disposed right angular sections on which are mounted traction wheels 7. The frame 5 is provided with side member 8 having their front ends converging towards each other and connected together.

Postjacent the front ends of the members 8 the frame is provided with a transverse member 9 bolted to said side members 8. Secured to the side members 8 postjacent the member 9 are the lower ends of a pair of upwardly extending standards 10, the upper ends of which have connected thereto bearings 11 in which are journaled the ends of a transversely disposed shaft 12.

Pivotally mounted on the shaft 12 adjacent the standards 10 and inwardly thereof are a pair of spaced conveyor supports 13 of a longitudinally disposed substantially triangular-shaped conveyor C. The oppositely disposed ends of the supports 13 extend across and are connected to pairs of aligned ends of a pair of spaced substantially triangular-shaped conveyor tracks or rails 14 forming part of said conveyor C.

The front ends of the members 8 and the member 9 are provided with bearings through which is journaled a longitudinally disposed drive shaft 15, the rear end of which is journaled in a gear housing 16 and has fixed thereto a bevel gear 17 in mesh with a similar gear 18 fixed to a transversely disposed shaft 19 journaled through said housing 16 and having end sections journaled in bearings 20, the latter being connected to the outer sides of the members 8 through the medium of bearing brackets 21. One end of the shaft 19 has fixed thereto a sprocket 22 connected to a sprocket wheel 23 fixed to one end of the shaft 12 by means of a chain 24 trained over said sprocket 22 and wheel 23 as clearly illustrated in the drawings.

One of the standards 10, adjacent the chain 24, has fixed thereto the rear end of a forwardly extending arm 25, the front end of which is adjustably connected to a similar arm 26 having its front end provided with a right angularly disposed section 27 engaging the forwardly disposed run of the chain 24. Said arm 26 is adjusted relative to the arm 25 to preclude slack in said chain 24.

The front end of the shaft 15 is connected to the rear end of a shaft 28 by means of a universal coupling 29, the front end of the shaft 28 being connected to a source of power, for instance a tractor (not shown), for driving the shaft 15. Said tractor is connected to the front end section of the frame 5 through the medium of a draft bar 30 as clearly shown in Figure 3 of the drawings and which serves to operate the device or machine over the ground.

The rear end of the frame 5 has mounted thereacross and fixed thereto a transversely extending guide shaft 31, the latter being disposed in arcuate-shaped slots 32 formed in conveyor supports 33 with the latter connected across the rear ends of the tracks 14 as clearly illustrated in Figure 2 of the drawings. It is to be understood that the radii of the slots 32 are generated from the center of the shaft 12 thereby enabling the rear ends of the tracks 14 to be pivoted about the shaft 12 with respect to the rear end of the frame 5 whereby said tracks may be disposed in raised position with respect to the frame 5 as illustrated in Figure 2 of the drawings and operated to lowered position with respect to the frame 5 as illustrated in Figure 3 of the drawings.

The supports 32 have bolted thereto the front ends of angle irons 34, the rear ends of which are fixed to the tracks 14. The upper faces of the angle irons 34 are provided with aligned bearings 35 through which are journaled the ends of a transversely disposed shaft 36 on which is fixed, adjacent the bearings 35, sprocket wheels 37 over which are trained chains 38.

The shaft 12 has also fixed thereto sprocket wheels 39 receiving the chains 38. The apex end sections of the tracks 14 have fixed thereto bearing blocks 40 in which is journaled a shaft 41 having keyed thereto idler sprockets 42 meshing with the chains 38 and dividing the latter into lower and front runs 43 and 44 with said runs being disposed between the sprocket wheels 37 and 39 and the other runs of said chains between the sprocket wheels 37 and 39 constituting upper runs 45.

Prejacent the rear end of the frame 5, the side members 8 have fixed to their side faces the lower ends of plates 46, the upper ends of the latter being provided with bearings through which are journaled the outer ends of a cross shaft 47. The outer ends of the cross shaft 47 have fixed thereto arms 48, the latter being connected to the upper ends of chains 49. The lower ends of the chains 49 are connected to a transversely disposed angle iron 50 fixed to the tracks 14 superjacent the lower runs 43 of the chains 38. One of the arms 48 has fashioned therewith an angularly disposed arm and which constitutes a bell crank lever. Said last mentioned arms are pivotally connected to the rear end of a rod 51. The front end of the rod 51 is pivotally connected to the lower end of an operating lever 52 pivotally connected adjacent its lower end to an arcuate-shaped rack 53 mounted on the front end of one of the members 8. Obviously, by operating the lever 52 the rear end of the conveyor C may be raised or lowered through the medium of the shaft 46, arms 48 and chains 49. The lever 52 is of the type equipped with a spring pressed dog (not shown) for engagement with the rack 53 whereby to maintain the rear end of the conveyor C in adjusted position.

The tracks or rails 14 are of an L-shaped configuration comprising horizontal and vertically disposed sections 54 and 55 respectively and with the vertically disposed sections constituting side flanges 56. The chains 39 have attached thereto spaced pairs of shafts 57 and 58 having rollers 59 mounted on their outer ends and tracking the sections 54 of said tracks 14 and with the flanges 56 serving as guides to preclude lateral displacement. The shafts 58 have pivotally mounted thereon looped inner ends of a plurality of transversely spaced U-shaped tines constituting pickers 60 for removing and gathering vegetables, for instance potatoes or the like, from the soil as hereinafter described.

The shafts 57 have mounted thereon the inner looped ends of a plurality of spaced leaf springs 61, the latter being connected together by transversely disposed angle irons 62. The outer ends of the springs 61 are bifurcated and embrace the sides of the tines or pickers 60 and with their crotch walls engaging the pickers 60 to preclude appreciable rearward displacement of the pickers during operation of the latter when disposed subjacent the lower runs 43 of the chains 38. However, should any of the pickers 60, during the forward movement of the machine and operation of the chains 38, encounter an obstruction or the like the respective springs coact therewith to permit rearward pivoting of the pickers.

Prejacent the standards 10, the undersides of the members 8 have secured thereto the upper ends of hangers 63, the lower ends of which are provided with bearings through which is journaled a shaft 64. Fixed to the shaft 64 and operable therewith are upper ends of spaced arcuate-shaped tines 65, the latter constituting a harrow 66 for conditioning the soil in advance of the pickers 60.

One end of the shaft 64 has fixed thereto an arm 67, the latter being pivotally connected to the rear end of a rod 68. The front end of the rod 68 is connected to the lower end of an operating lever 69, the latter being pivotally connected to an arcuate-shaped rack 70. The operating lever 69 is provided with a spring pressed dog (not shown) for cooperation with the teeth of the rack 70 whereby to maintain the lower end of the lever 69 in a desired adjusted position. Obviously, adjustment of the lever 69 with respect to the rack 70 serves to actuate the harrow 66 to raised or lowered position as depicted in Figures 2 and 3 of the drawings respectively.

Embraced by the conveyor C and transversely secured to the frame 5 prejacent its rear end is a discharge conveyor D, one end of which extends an appreciable distance beyond one side of the frame 5 as illustrated in Figure 1 of the drawings. The ends of the conveyor D have journaled therethrough shafts 71 and 72. Fixed to the shafts 71 and 72 are spaced sprockets over which are trained chains 73 equipped with transversely disposed flights 74, the upper run of which receives thereon vegetables and the like gathered by the pickers 60 as hereinafter more fully described. One end of the shaft 72 is provided with a sprocket 75 connected to a similar sprocket 76 mounted on a stub shaft 77 carried on one side of the conveyor postjacent one of the brackets 21.

The stub shaft 77 is connected to a shaft 78 by means of a shaft 79, the latter being connected to the shafts 77 and 78 by means of universal couplings 80. The shaft 78 is mounted in bearings 81 carried by the adjacent brackets 21 and said shaft 78 has fixed thereto a bevel gear 82, the latter meshing with a similar gear 83 fixed to the shaft 19. Obviously, operation of the shaft 19 serves to effect operation of the conveyor D through the medium of the shafts 77, 78 and 79, it being understood that the sprockets 75 and 76 are connected together by a chain 84 as clearly illustrated in Figure 1 of the drawings.

The shaft 12 is provided with a pair of bearings 85 fixed to the upper end of an inclined chute 86, the lower end of said chute being connected to one side of the conveyor D and disposed over the upper run of the flights 74 thereof whereby vegetables gathered by the pickers 60 and conveyed upwardly towards the upper end of the chute 86 are discharged therein and as a consequence deposited onto the conveyor D whence they are conveyed to a desired location laterally of the machine.

During operation of the machine the harrow 66 is disposed in lowered position as illustrated in Figure 3 to condition the ground in advance of the pickers 60 and the rear end of the conveyor C is operated to lowered position to effect operation of said pickers for conveying the vegetables gathered thereby forwardly and upwardly for discharge into the chute 86.

It is to be understood that while my invention is particularly adapted to the gathering of various vegetables, for instance potatoes and the like, the same may be advantageously utilized for removing stones and other similar undesirable material from the ground whereby to condition the soil for tilling.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in various forms, and that the invention comprehends all construction within the scope of the appended claims.

What I claim is:

1. In a machine of the character described, a wheel supported frame, upwardly extending standards connected to said frame adjacent the front end of the latter, tracks of substantially triangular configuration in elevation having upper ends pivotally connected to the upper ends of said supports, a cross bar carried by the rear end of said frame, plates mounted on said tracks adjacent the rear ends thereof and provided with arcuate-shaped slots receiving said cross bar to permit raising and lowering of the rear ends of said tracks with respect to said frame, means carried by said frame and connected to the rear end of said tracks to effect raising and lowering of the latter, endless conveyor chains operable over said tracks, pickers connected to said chains and operable by the latter to remove vegetables and the like from the soil subjacent said frame, a transverse conveyor carried by said frame, an upwardly extending chute connected to said transverse conveyor for receiving vegetables and the like discharged from said pickers, means carried by said frame for operating said transverse conveyor, and means mounted on said frame and connected to said chains for operating said pickers.

2. In a machine of the character described, a wheel supported frame, upwardly extending standards connected to said frame adjacent the front end of the latter, tracks of substantially triangular configuration in elevation having upper ends pivotally connected to the upper ends of said supports, a cross bar carried by the rear end of said frame, plates mounted on said tracks adjacent the rear ends thereof and provided with arcuate-shaped slots receiving said cross bar to permit raising and lowering of the rear ends of said tracks with respect to said frame, means carried by said frame and connected to the rear end of said tracks to effect raising and lowering of the latter, endless conveyor chains operable over said tracks, pickers connected to said chains and operable by the latter to remove vegetables and the like from the soil subjacent said frame, a transverse conveyor carried by said frame, an upwardly extending chute connected to said transverse conveyor for receiving vegetables and the like discharged from said pickers, means carried by said frame for operating said transverse conveyor, means mounted on said frame and connected to said chains for operating said pickers, and a harrow adjustably carried by said frame for conditioning the soil in advance of said pickers.

NORBERT A. DREIKOSEN.